United States Patent [19]

Kalina

[11] 4,098,102
[45] Jul. 4, 1978

[54] AUTO SAFE LOCK

[76] Inventor: Edward O. Kalina, Midlothian, Ill. 60445

[21] Appl. No.: 778,380

[22] Filed: Mar. 17, 1977

[51] Int. Cl.$^2$ ................. B60R 25/00; E05B 17/14
[52] U.S. Cl. ........................... 70/237; 70/418; 70/428; 70/439; 70/DIG. 56; 200/61.54; 180/114
[58] Field of Search .......... 70/237, 252, 258, 417–419, 70/423, 424, 427, 428, 439, 15, 18, 19, 158, 163, 167, 179, 211, 212, DIG. 43, DIG. 49, DIG. 56; 200/44, 61.54; 180/114

[56] References Cited

U.S. PATENT DOCUMENTS

| | | | |
|---|---|---|---|
| 3,296,842 | 1/1967 | Auerbach et al. | 70/163 X |
| 3,391,555 | 7/1968 | Mamo | 70/258 |
| 3,512,380 | 5/1970 | Winter | 70/19 |
| 3,665,738 | 5/1972 | Pescuma et al. | 70/427 X |
| 3,772,645 | 11/1973 | Odenz et al. | 200/44 X |
| 3,948,069 | 4/1976 | Imbriano | 70/418 X |
| 4,020,662 | 5/1977 | Fowler | 200/61.54 X |
| 4,038,845 | 8/1977 | Szlakman | 70/211 |

Primary Examiner—Roy D. Frazier
Assistant Examiner—William E. Lyddane
Attorney, Agent, or Firm—Sabin C. Bronson

[57] ABSTRACT

A tamper-proof lock housing is provided for enclosing the ignition lock of an automobile which is ordinarily mounted on the steering column of the automobile. The housing is in two halves; the bottom half fitting about the lower half of the steering column, and is secured thereto. The upper half fits down over the lower half and the ignition lock is securely joined thereto by connection breakers so that the two then box in the ignition key switch. The auto safe lock box protects the steering wheel lock and the ignition key.

An auxilliary alarm system is provided consisting of a separate battery, additional horn, voltage regulator and a time delay switch. This could work solely off the auto safe lock box itself, or it could work from an alternate lock installed on the outside of the car.

4 Claims, 7 Drawing Figures

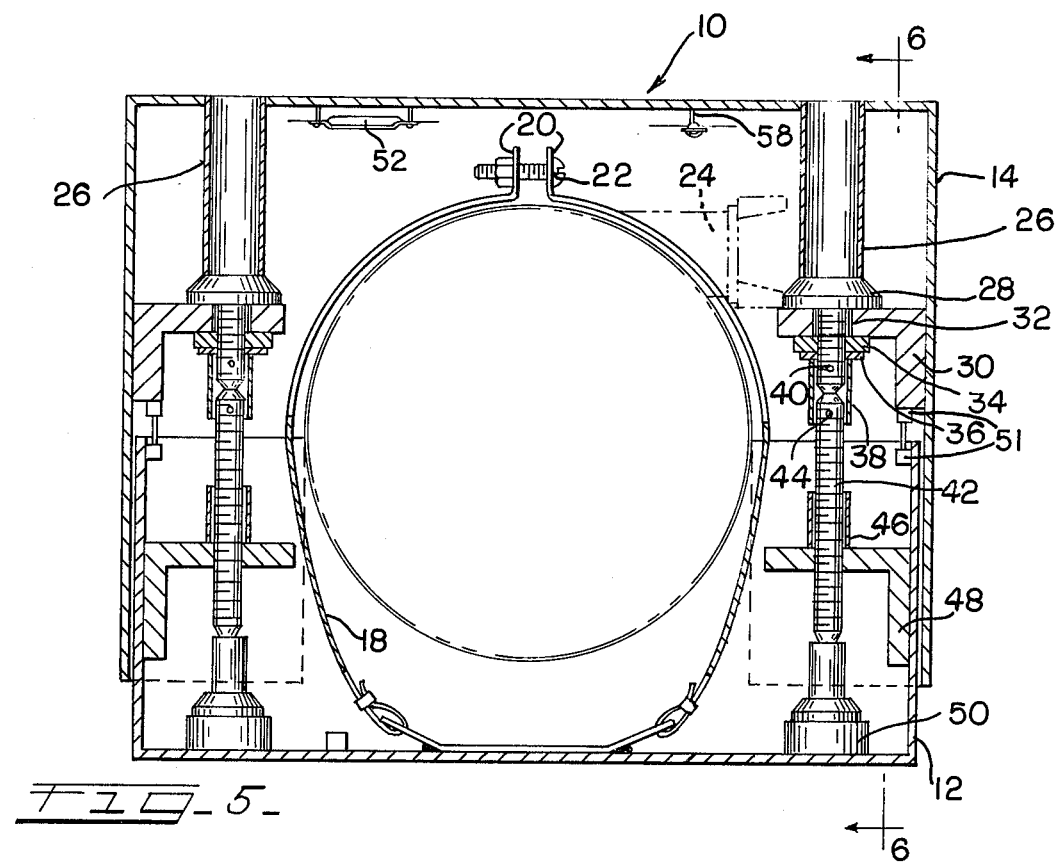
FIG-5-
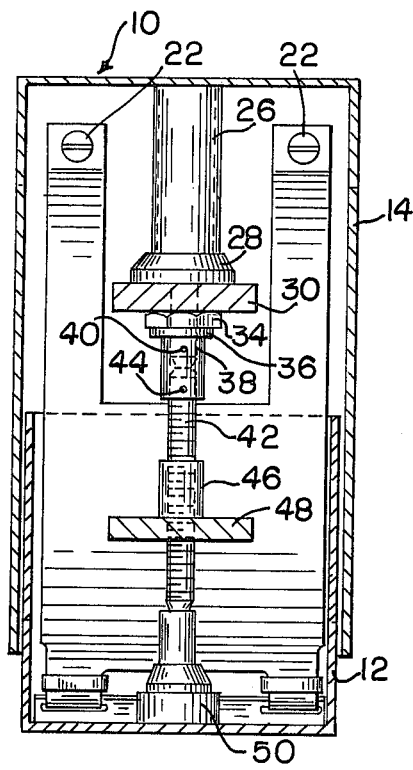
FIG-6-
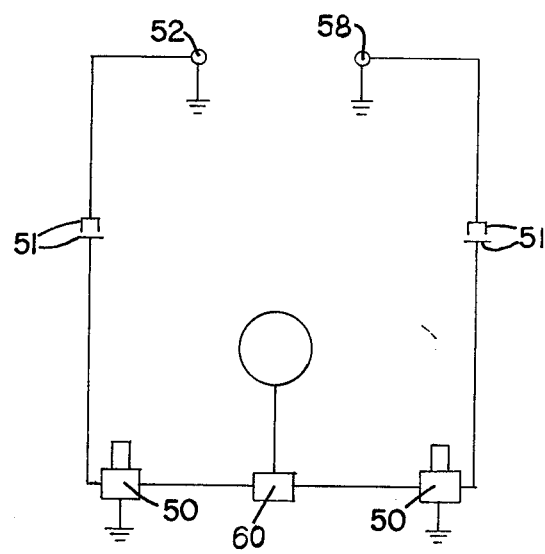
FIG-7-

AUTO SAFE LOCK

BACKGROUND AND SUMMARY OF THE INVENTION

Locking devices furnished by the auto manufacturers for automobiles while parked, or not in use temporarily, are old in the art, but the professional auto thief does not have to waste much time getting into an automobile and then with only the switch key lock to overcome in getting the automobile started. Furthermore, if the thief notices an auto lock system, which has to be released in order to gain entrance through a door, the thief simply reaches up from under the car with a pair of snips and cuts one battery cable and the whole alarm system is broken, and the car may be entered, stripped, or towed away without the alarm system working at all.

Also, the ordinary steering column locking device can be made ineffective by prying on the lock which is usually on the side of the steering column.

Many inventions have been resorted to in the prior art to prevent the theft of automobiles but have generally been ineffective in preventing a professional thief from getting away with the automobile.

It is, therefore, the purpose of this invention to provide an enclosure for the ignition and starting means of an automobile, which means is usually located on the right side of the steering column as a convenience in starting and stopping the motor. This enclosure is constructed of such materials, and put together about the ignition switch in such a manner as to be practically tamper-proof.

BRIEF DESCRIPTION OF THE DRAWINGS

Referring now to the accompanying drawings forming part of this application and wherein like reference characters indicate like parts:

FIG. 5 is a cross sectional view on the line 5—5 of FIG. 1.

FIG. 6 is a cross sectional view on the line 6—6 of FIG. 5.

FIG. 7 is a wiring diagram of the electric circuits.

DESCRIPTION OF THE PREFERRED EMBODIMENT

Figure 1:
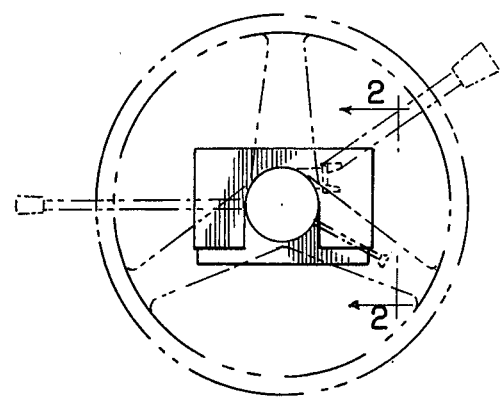
FIG. 1 is a top plan view of the lock housing as it would appear mounted on a steering column, shown in dotted lines.

Referring now to the drawings in detail the numeral 10 indicates the lock housing which is formed in two telescopically engageable parts, 12 indicating the lower part, and 14 indicating the upper part. This housing is rectangular in shape and is constructed of ⅛ inch steel. The side walls of the lower part of the housing have corresponding semi-circular cut-outs therein, in diameter equal to the diameter of the steering column indicated in dotted lines at 16, so that when placed on the steering column they will fit snugly thereabout.

The lower part 12 of the housing is provided with a sleeve 18, the size of the steering column 16. Sleeve 18 is split at its upper portion and the ends are turned into a pair of flanges 20, which, when the sleeve is placed about the steering column, are clamped together by a pair of bolts 22. Thus the lower portion 12 is secured to the steering column. The central part of the upper half of the sleeve is removed as shown clearly in FIG. 4, so that when the sleeve and lower portion 12 of the housing is applied to the steering column, the ignition switch 24 of the automobile will project through said central part and be completely covered when the upper part 14 is secured down over the lower part 12.

To lock the two parts of the housing together there is provided a ferralium alloy steel key cylinder 26 at each end of the top portion of the housing. These key cylinders are welded about their upper ends to the margins of openings in the top of the upper portion of the housing. These cylinders are about ½ inch in diameter and 2 inches long, and extend down to a key lock 28 which rests on top of a heavy angle bracket 30 secured to the end wall of the upper lock housing 14. The locking mechanism is contained within the key lock 28. There is an axial opening in the bracket under the key lock 28 and a threaded stub shaft 32 projects downwardly from the bottom of the key lock 28 through said opening.

On the stub shaft 32 is mounted a lock-nut 34 which is run up to contact the under side of the horizontal flange of the bracket 30 and secure the key cylinder and key lock to the upper part of the housing. Under the lock-nut 34 is a washer 36 also threaded on the stub shaft 32 and having a pin sleeve 38 extending downwardly therefrom. This pin sleeve 38 is pinned as at 40 to the stub shaft 32. Sleeve 38 also encloses the upper end of the lock extension shaft 42 which is also pinned as at 44 to the sleeve 38. Another sleeve 46 is fixed on end to a horizontal flange of another angle bracket 48 about an opening in said flange in axial alignment with the opening in the horizontal flange of bracket 30. The extension shaft 42, while pinned at its upper end to the sleeve 38, extends downwardly through sleeve 46 and opening in flange of bracket 48 to the upper end of plunger switch 50.

Interlock circuit connection breakers 51—51 are mounted on each side of the top half 14 and bottom half 12 of the lock housing, which breakers meet and join together to make contact when the key 54 is turned clockwise to bring the parts of the housing together about the steering column, and enclosing the vehicle ignition switch in position which locks the steering wheel.

The key for the lock comprises a circular knob 54 at one end of a shaft 52 and the key block 56 at the other end, the lower face of which is cut to fit the articulation of the face of the lock mechanism in the key lock 28. Thus when the key is inserted into the sleeve 26, as suggested in FIG. 4, and passed down therethrough to the key lock 28 and mates with the part of the lock mechanism, the key may be turned thus turning the threaded shafts 32 and 42 until shaft 42 engages the plunger switch 50 which sets the mechanism.

Figure 2:
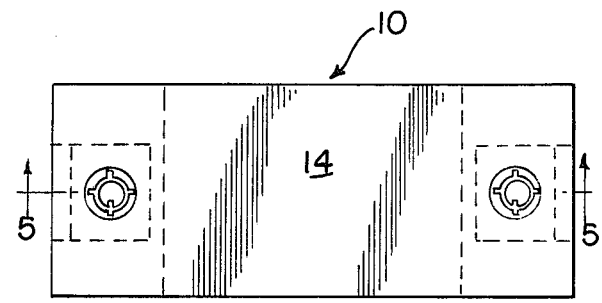
FIG. 2 is a top plan view of the housing.
Figure 3:
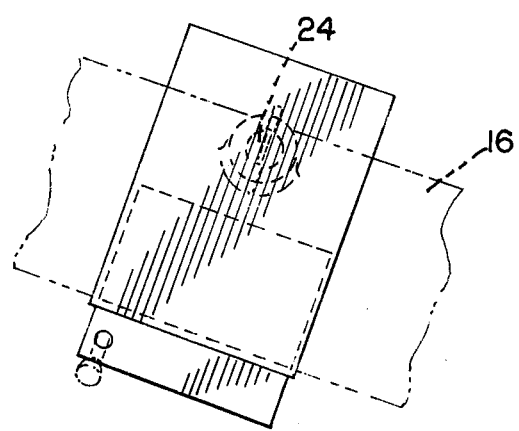
FIG. 3 is an end view of the housing.
Figure 4:
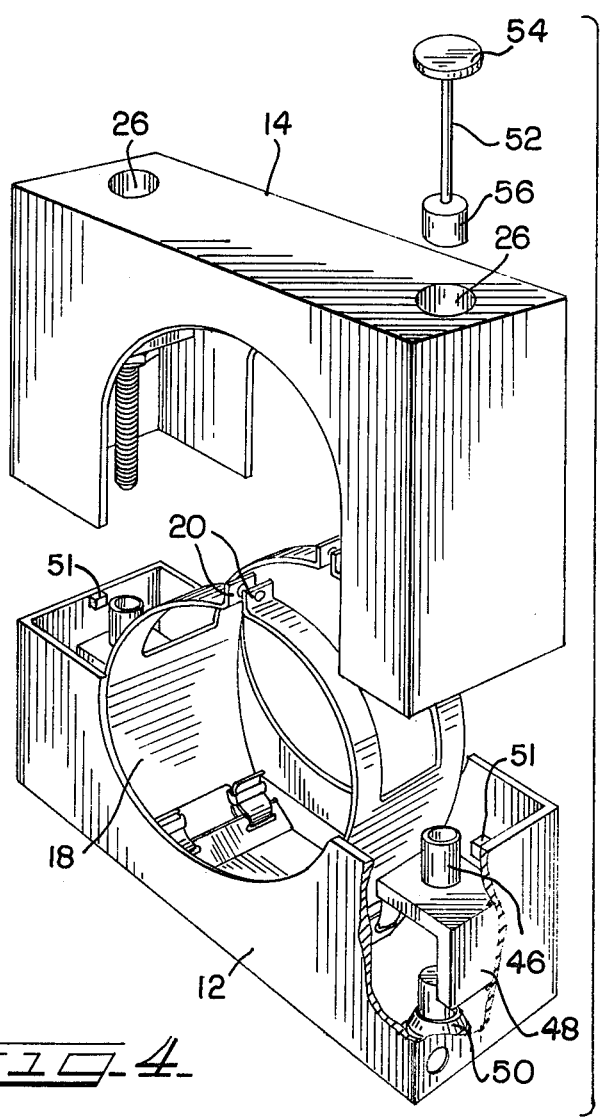
FIG. 4 is a perspective view of the two-part housing, showing the means of attaching the lower part to the steering column, and the upper part telescoping down over the lower part.

It will be noted in FIGS. 2, 4 and 5 that there are two key cylinders 26, one at each upper end of the lock housing as clearly shown in FIGS. 2, 4 and 5. These cylinders are mounted to the top half of the lock housing so as to make it necessary for a thief to be in upright position to gain access through the cylinders to the lock mechanism to try to pick the lock. In this upright position it would be very difficult to pick the locks without being noticed. If the locks were on the side or bottom of the housing the intruder could lay on the seat or floor to tamper with the lock.

Only one of the lock mechanisms has been described as both are identical, although each lock mechanism is keyed differently, which makes it doubly difficult to get to the vehicle ignition switch.

The above described auto safe lock may be installed on a strictly manual basis but for more efficiency and greater safety it should be installed with the following described electrical attachments. Without the addition of the electrical attachments the device would be extremely effective to prevent an unauthorized party to get the housing parts apart to thereby gain access to the car ignition switch and start the automobile. With the addition of the electrical attachments more efficiency and greater safety are attained.

A horizontal mercury switch 52 is mounted in the top of the box with a bracket and the usual leveling screws to level out the switch.

Also a vertical mercury switch 58 is mounted in the top of the box with bracket and the usual leveling screws to level out the switch.

If the lock housing is tampered with one or the other of these switches will set off the sounding device, and also if the automobile is lifted or towed it will set off the alarm.

The interlock circuit connections 51—51 are mounted on each side of the top half and bottom half of the lock housing to make contact when the housing is locked.

The two plunger switches 50—50 are connected to the connection breakers 51—51 which in turn are connected to the horizontal 52 and the vertical 58 mercury switches.

The auxillary battery, regulator, and horn, are mounted under the hood by the dash board, and the positive or hot wire from which come up through the steering column and out to the junction box 60 and thence to the plunger switches 50—50, to the connection breakers, and to the mercury switches 52 and 58.

I claim:

1. A safety lock for the conventional ignition lock which projects laterally from the steering column of an automobile, said safety lock comprising; a housing including telescopically joined upper and lower parts removably mounted on the steering column and enclosing the ignition lock, the lower part having side and end walls and a bottom, and a removable clamp extending around the steering column for securing the lower part to the column, the upper part having a top and side and end walls telescoping down over the lower part and enclosing the ignition lock, and lock means attached to and recessed below the top within the upper part and having a portion extending within and releasably secured to a cooperating sleeve bracket fixed to said lower part.

2. The structure as set forth in claim 1 wherein said lock means is accessible only through the top of the upper part of the housing.

3. The structure as set forth in claim 1 wherein said lock means includes a key cylinder secured at one end about an opening in the top of the upper portion of the housing and extending to lock mechanism within a key lock secured to an end wall of the upper part of the housing.

4. The structure as set forth in claim 1 including means for detecting movements of said housing other than normal, said detecting means being simultaneously set when the locking of said parts is effected.

* * * * *